July 8, 1952 C. E. LINDEN ET AL 2,602,682
KEY MECHANISM FOR RADIAL DRILL ARMS
Filed Sept. 3, 1948 3 Sheets-Sheet 1

INVENTORS
Carl E. Linden
Frank O. Wetzel
BY Wood, Arey, Herron & Evans
ATTORNEYS July 8, 1952  C. E. LINDEN ET AL  2,602,682
KEY MECHANISM FOR RADIAL DRILL ARMS
Filed Sept. 3, 1948  3 Sheets-Sheet 2

INVENTORS.
Carl E. Linden
BY Frank O. Wetzel
Wood, Arey, Herron & Evans
ATTORNEYS.

July 8, 1952 — C. E. LINDEN ET AL — 2,602,682
KEY MECHANISM FOR RADIAL DRILL ARMS
Filed Sept. 3, 1948 — 3 Sheets-Sheet 3
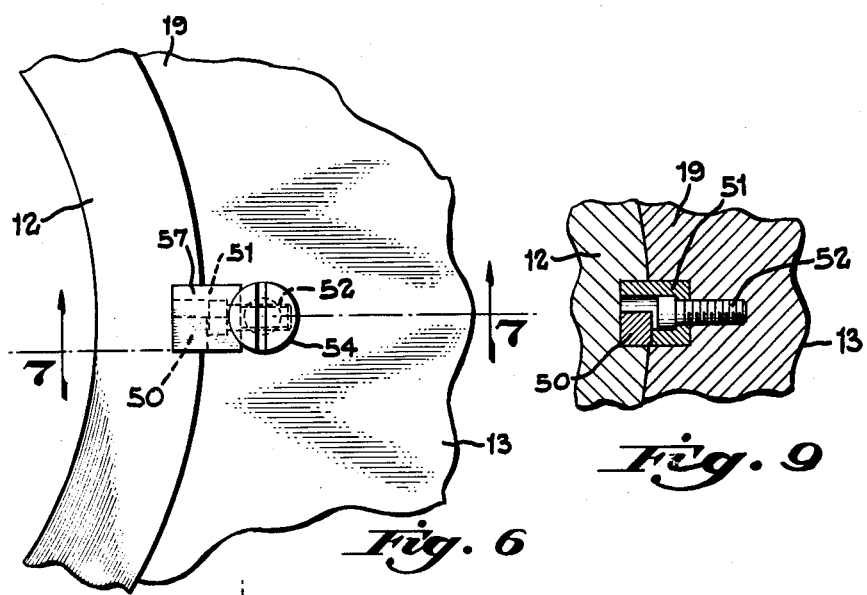
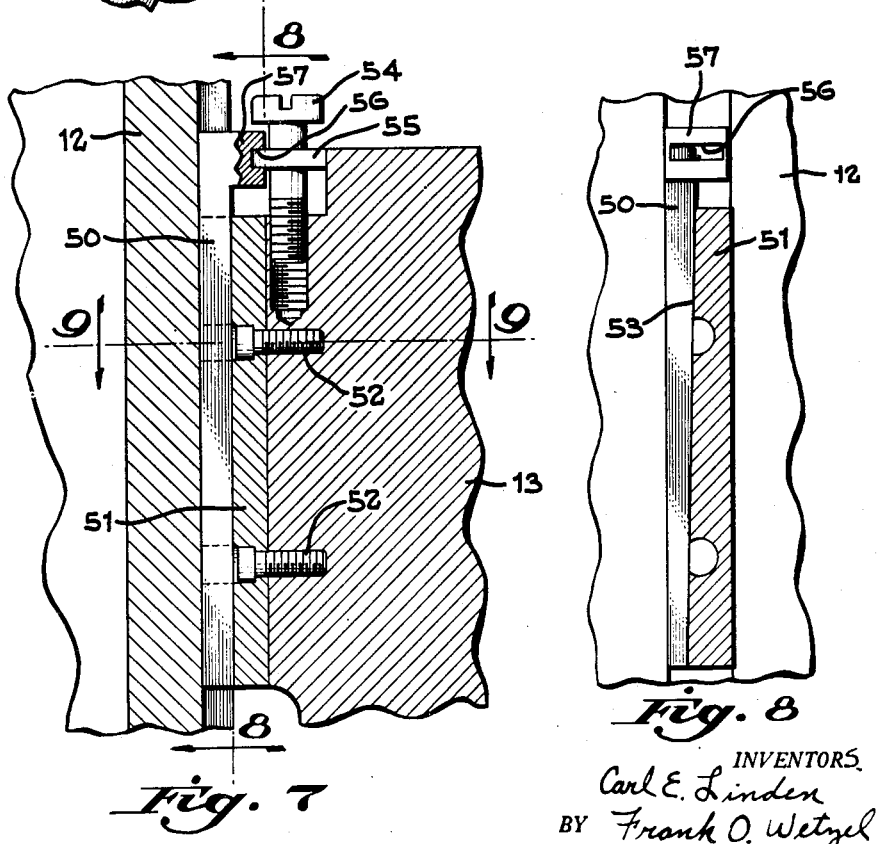
INVENTORS
Carl E. Linden
Frank O. Wetzel
BY Wood, Arey, Herron & Evans
ATTORNEYS.

Patented July 8, 1952

2,602,682

UNITED STATES PATENT OFFICE 2,602,682

KEY MECHANISM FOR RADIAL DRILL ARMS

Carl E. Linden, Cincinnati, and Frank O. Wetzel, Norwood, Ohio, assignors to The Fosdick Machine Tool Company, Cincinnati, Ohio, a corporation of Ohio Application September 3, 1948, Serial No. 47,696

3 Claims. (Cl. 287—52.05)

This invention relates generally to machine tools and resides specifically in an improved key mechanism incorporated between the arm and column of a radial drill to establish a slidable non-rotative connection between the arm and column.

Radial drills in general comprise a work mounting base having a column rotatably mounted thereon and an arm slidable vertically on the column by means of an elevating screw. The arm customarily is keyed to the column so that the arm and column may be rotated radially as a unit relative to the base. Column clamping mechanism is incorporated in the base to lock or clamp the column and thus fix the arm in its radial position. However, should any looseness exist in the keyed connection between the arm and column, the arm and its drill head may shift perceptibly with respect to the work, even though the column is clamped.

In its preferred construction, the arm includes a split sleeve which slidably embraces the column. Clamping apparatus is provided to contract the sleeve and cause it to grip the column and lock the arm at its selected elevation. Although this construction is highly desirable since it provides maximum rigidity and structural simplicity, nevertheless it has the inherent disadvantage of causing a slight rotative creep because of uneven engagement with the column by the split sections of the sleeve, as they are drawn together in clamping. Thus, in setting up the machine, the arm may be located with precision relative to the work and the column clamped to the base, but the arm may shift before it is clamped to the column or during the clamping operation. In many instances this is sufficient to require readjustment of the arm.

One of the primary objects of the invention has been to provide an adjustable key mechanism which provides precision engagement between the arm and column so that there is no lost motion between the arm and column when the column is clamped and the arm unclamped, and to prevent creeping of the arm, due to unequal engagement of the split sleeve during clamping of the arms. This has been achieved by the use of a compensating key structure which is adjustable either automatically or manually to maintain a close fit with a keyway formed in the column such that the arm and its key is slidable without undue resistance and which at the same time prevents looseness or play between the column and arm radially.

Another object has been to provide a key structure which may be fabricated and assembled in the machine without precision fitting but which, by virtue of its adjustability, establishes a precision slidable fit relative to the column keyway.

A further object has been to provide a spring loaded tapered key structure of maximum simplicity which automatically takes up any looseness between the arm and column so that the two parts are maintained in permanent alignment radially, free from the effects of wear in spite of long periods of service and which thereby improves the efficiency and accuracy of the machine.

In the operation of a radial drill, the arm frequently is raised and lowered in making adjustments relative to the work. If the machine is equipped with a fixed key, wear occurs after the machine has been in service even if the key is hardened and accurately fitted. The improved key structure, in its preferred form, contemplates a tapered, spring loaded key engaged in a tapered keyway so that the key automatically compensates for wear and maintains an accurate fit, free from lost motion for extended service periods. In its modified form, the key is tapered longitudinally and may be adjusted by hand when adjustment is required.

There are several types of clamping mechanisms employed to clamp the column relative to its base. A common arrangement incorporates the contractable split ring structure, generally similar to the arm clamp. This arrangement involves the rotative inching or creeping problem above noted with reference to the arm clamp. The present structure preferably is embodied in a machine equipped with an improved column clamp structure which is free from creeping action as disclosed in Patent Nos. 2,375,169, issued May 1, 1945 and 2,380,055, issued July 10, 1945, both to C. E. Linden, et al. This form of column clamp exerts no rotative forces on the column, so that in combination with the improved key structure, the operator may swing the arm accurately and with precision to align the drilling tool with the hole centers and clamp the arm and column without any creeping or inching.

Further features and advantages of the invention will be more fully disclosed in the specification in conjunction with the drawings in which:

Figure 6 is a fragmentary top plan view of a portion of the column and arm of a radial drill illustrating an adjustable taper key incorporated therein.

Figure 7 is a sectional view taken on line 7—7, Figure 6, further detailing the arrangement disclosed in Figure 6.

Figure 8 is a sectional view taken on line 8—8, Figure 7, further illustrating the structure disclosed in Figure 7.

Figure 9 is a sectional view taken on line 9—9, Figure 7, illustrating the key and its mounting bar associated with the arm and column.

Figure 1:
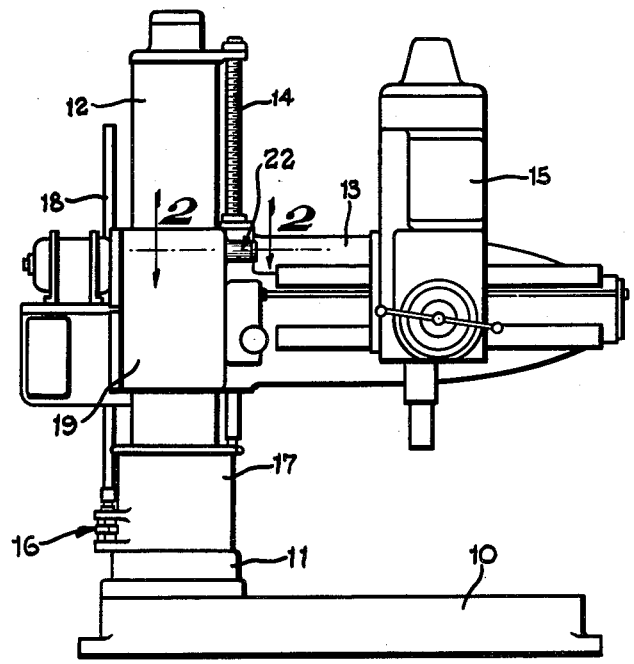
Figure 1 is a general side elevation of a radial drill incorporating the improved key structure between the arm and column.

Described generally with reference to Figure 1, the wear compensating key mechanism is incorporated in a radial drill which follows the usual construction, including a base 10 having a stump 11 mounted thereon, providing a rotative support bearing for the column 12. An arm 13, overhanging the base, is slidably mounted upon the column and is adjusted vertically by means of an elevating screw 14. The arm and column customarily are keyed together so as to rotate as a unit relative to the stump. The drill head 15 is slidably mounted upon the arm for horizontal adjustment longitudinally of the arm. Thus, the column and arm may be swung radially and the head adjusted longitudinally to provide universal adjustment of the drill head relative to the work.

Clamping mechanism is provided at the lower end of the column to clamp the column relative to the stump and an arm clamp is provided to clamp the arm rigidly to the column. After the machine is set up with the arm properly related to the hole center and the column clamped to the stump to prevent radial movement of the arm, the arm may be clamped or unclamped relative to the column to permit the arm and drill head to be lowered or elevated relative to the work. Normally the clamping effect of the arm causes a slight displacement or inching of the arm relative to the column which is multiplied at the drill head, causing the drill or cutting tool to be shifted relative to the hole center. Even though the arm may be keyed to the column, the slight clearance necessarily maintained between the key and its keyway, often increased by wear, permits sufficient lost motion to throw the drill out of alignment. The improved key mechanism eliminates this lost motion and maintains the tool accurately in alignment with the hole centers so that the arm clamp may be operated without requiring readjustment of the arm to reestablish tool alignment.

The column clamp, indicated generally at 16, forms a part of the counterturned base 17 of the column and clamps the column rigidly in its adjusted position to the stump. The column clamp is actuated by means of a lever (not shown) which may be mounted on the drill head and connected to the vertical clamp actuating shaft 18 by means well known to those skilled in the art.

The arm clamp is incorporated in the sleeve 19, which is formed as an integral part of the arm and embraces the column. The purpose of the arm clamp is to permit the arm to be adjusted vertically by the elevating screw and to clamp is rigidly to the column in its adjusted position.

A clamp mechanism also is incorporated in the drill head serving to clamp the head rigidly in its adjusted position relative to the arm. By virtue of the several clamping devices, the arm may be swung radially, the head shifted longitudinally and the arm and head as a unit adjusted vertically with respect to the work. After these several adjustments have been made, the clamping mechanism for the respective parts is actuated to clamp the parts rigidly in position for drilling.

Figure 4:
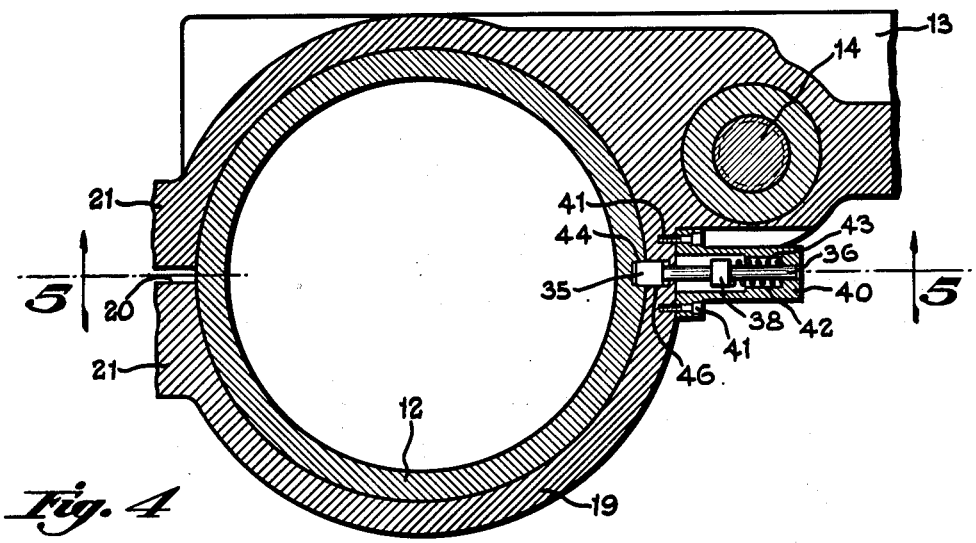
Figure 4 is a sectional view similar to Figure 2 illustrating a slightly modified key structure in its relationship with the arm and column.

As shown in Figure 4, the cylindrical portion 19 of the arm, which embraces the column 12, is slotted as at 20. The arm clamping mechanism (not shown) engages the lugs 21—21 adjacent the slot 20 so that the lugs are drawn toward each other to contract the sleeve and establish a clamping engagement with the column when the mechanism is actuated. As above noted, there is a tendency for the arm to creep slightly relative to the column by reason of differential rates of movement and friction between the two halves of the sleeve, which may be multiplied several times when the head is in its outward adjustment.

Described in detail with reference to Figures 2 and 3, the improved key, indicated generally at 22, is slidably sustained in a bore 23 formed in a boss 24 as part of the arm casting. The key is in the form of a cylindrical plunger 25 having a tapered key or spur 26 which is engaged in a correspondingly tapered keyway 27 extending lengthwise of the column 12. The opposite end of plunger 25 includes a stud 28 providing a shoulder 29. A compression spring 30 is telescopically engaged on stud 28, having one end seated upon shoulder 29 and having its opposite end seated against a closure plate 32 secured in position by means of screws 33. The compression spring 30 urges the taper key 26 constantly into engagement with the tapered keyway 27 so that wear of the key and keyway automatically is taken up. For this purpose a working clearance, indicated at 34, is provided respectively between the end of the key and keyway and between the end of the plunger and the outside diameter of the column.

Figures 2, 3:
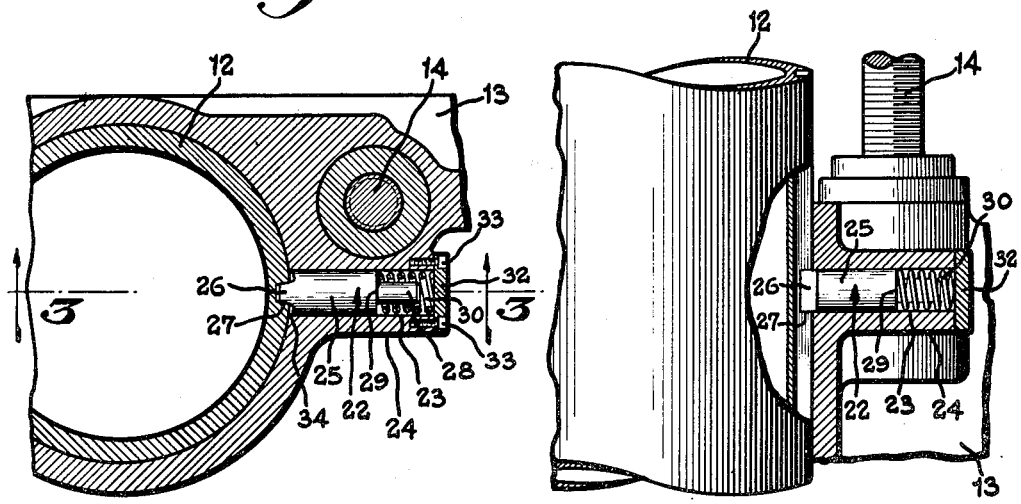
Figure 2 is an enlarged fragmentary sectional view taken on line 2—2, Figure 1, detailing the key structure in its operating environment.
Figure 3 is a fragmentary sectional view taken on line 3—3, Figure 2, further illustrating the structural details of the improved key arrangement.
Figure 5:
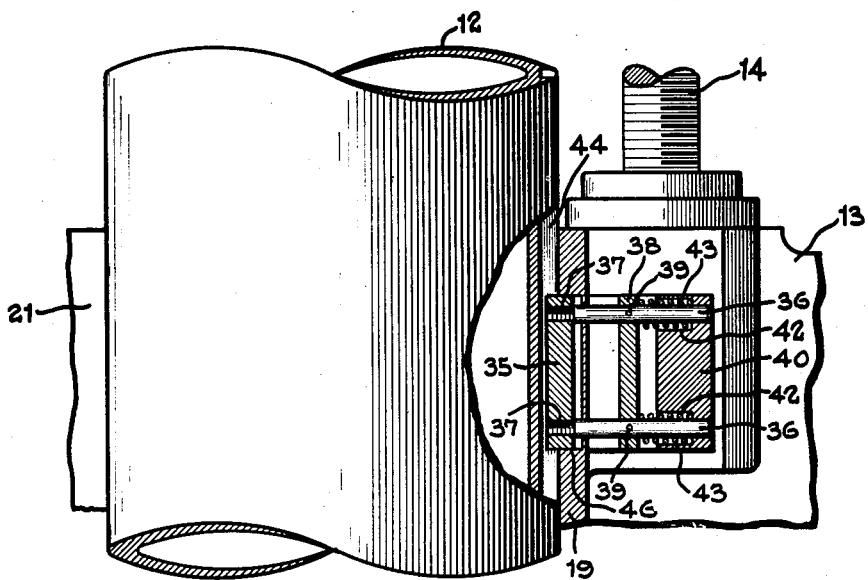
Figure 5 is a fragmentary sectional view taken on line 5—5, Figure 4, further illustrating the modified key structure.

The structure shown in Figures 4 and 5 follows in principle the spring loaded taper key disclosed in Figures 2 and 3. In the modified structure however, an elongated tapered key 35 is utilized in place of the relatively short spur type of key 26 previously disclosed. The elongated key 35 is mounted by means of a pair of plungers 36—36 having their ends screwthreaded as at 37 into the opposite ends of the key 35. The plungers 36—36 are secured together for unitary movement by means of a connecting bar 38 which is pinned as at 39 intermediate the length of the plungers. These plungers are slidably mounted in a casing 40 which is secured to the sleeve portion 19 of the arm by a series of screws 41. The outer ends of the plungers are extended through bores formed in the casing 40 and the casing further is provided with counterbores 42—42 to receive the compression springs 43—43 which are disposed upon the respective plungers. The compression springs 43 are seated against the outer ends of the bores 42 with their opposite ends engaged against the connecting bar 38 to urge the elongated key inwardly into its correspondingly tapered keyway 44. The elongated key 35 is seated in a slot 46 milled in the arm portion 19 so that a non-rotatable connection is established by the key between the arm portion 19 and the column 12.

The structure is assembled by placing the key 35 in the slot 46, then inserting the plungers 36—36 through the bores opening into the slot and screwing them into the key. The connecting bar 38 next is pinned in place and the springs 43—43 inserted on the plungers. The casing 40 then is slipped upon the ends of the plungers and secured in place by means of the screws 41.

In the structure disclosed in Figures 6 to 9 inclusive, a manually adjusted key 50 is provided. This key is tapered lengthwise and is mounted in a slide bar 51 secured by screws 52 to the arm section 19. Bar 51 includes a longitudinal slot 53 of taper form corresponding to the taper of the key so that the opposite side edges of the key and bar are parallel. An adjustment screw 54 includes a collar 55 engaging a slot 56 formed in the head 57 of key 50 to adjust the key longitudinally. By virtue of its taper, downward adjustment of the key causes an increase in the width of the combined key and mounting bar so that the assembly may be adjusted to take up any looseness which may develop between the key and its keyway.

By the provision of the self-compensating spring loaded taper keys disclosed in Figures 2 to 5 inclusive, the keyed relationship between the column and arm is maintained automatically with precision for long periods of service without attention, since the spring automatically compensates for any wear which may occur either in the key or the keyway. Although the parts need not be precision fitted, the taper effect establishes an accurate key fit so that there is substantially no relative movement possible between the arm and column. After the column is clamped, the relationship of the tool and work center cannot be disturbed either before clamping the arm or by any shift or creep between the column and arm at the time of clamping the arm. This results in improved efficiency and greater work precision since the operator is able conveniently to make the required adjustment and to clamp the arm without danger of shifting it.

Having described our invention, we claim:

1. An adjustable key structure for a radial drill having a cylindrical column and an arm having a bore slidably engaged on the column, said key structure comprising, a longitudinal slide bar mounted in the bore of the arm, the column having a longitudinal keyway, the slide bar being secured in the bore of the arm and slidably engaged in said keyway, a longitudinally tapered key cooperating with the said slide bar, the slide bar having a longitudinally tapered slot complementary to the taper of the key to receive the same, said slide bar and key in assembled relationship providing a key structure having opposite side edges in parallelism complementary to the sides of the keyway of the column and adjustable widthwise relative to the keyway by longitudinal adjustment of the key with respect to the slide bar, and an adjustment screw arranged to shift the key longitudinally relative to the slide bar and thereby to vary the width of the key structure to compensate for looseness between the assembled key structure and keyway.

2. An adjustable key structure for a radial drill having a cylindrical column and an arm having a bore slidably engaged on the column, said key structure comprising, a longitudinal slide bar mounted in the bore of the arm, the said bore having a longitudinal slot providing a seat for the slide bar, the said column having a longitudinal keyway in alignment with and facing the slot of the arm bore, said slide bar being secured in said slot and slidably engaged in said keyway, a longitudinally tapered key cooperating with the said slide bar, the slide bar having a longitudinally tapered slot complementary to the tapered key to receive the same, said slide bar and key in assembled relationship providing a key structure having opposite side edges in parallelism complementary to the sides of the keyway of the column and adjustable widthwise relative to the keyway by longitudinal adjustment of the key with respect to the slide bar, the key having its upper end extended beyond the end of the slide bar and including a transverse slot, and an adjustment screw threaded into the top of the arm, the adjustment screw including a collar engaged in said slot operable to shift the key longitudinally relative to the slide bar and thereby to vary the width of the key structure to compensate for looseness between the assembled key structure and keyway by rotary adjustment of the screw.

3. An adjustable key structure for a radial drill having a cylindrical column and an arm having a bore slidably engaged on the column, said key structure comprising, a longitudinal slide bar mounted in the bore of the arm, the said bore having a longitudinal slot providing a seat for the slide bar, the said column having a longitudinal keyway in alignment with and facing the slot of the arm bore, said slide bar being secured in said slot and extending into said keyway and bearing against one side of the keyway, a longitudinally tapered key having a substantially square cross section bearing against the opposite side of the keyway, the slide bar having a longitudinally tapered slot of substantially square cross section complementary to the taper of the key to receive the same, said slide way and key in assembled relationship providing a key structure having opposite side edges in parallelism complementary to the sides of the keyway of the column and adjustable in width with respect to the keyway of longitudinal adjustment of the tapered key relative to the slide bar, and an adjustment screw arranged to shift the key longitudinally relative to the slide bar and thereby to vary the width of the key structure to compensate for looseness between the assembled key structure and keyway.

CARL E. LINDEN.
FRANK O. WETZEL.

REFERENCES CITED

The following references are of record in the file of this patent:

UNITED STATES PATENTS

| Number | Name | Date |
|---|---|---|
| 373,957 | Young | Nov. 29, 1887 |
| 430,143 | Nordberg et al. | June 17, 1890 |
| 2,244,778 | Horsley | June 10, 1941 |
| 2,298,741 | Lazna | Dec. 12, 1942 |